(12) United States Patent
Ali et al.

(10) Patent No.: US 7,711,953 B2
(45) Date of Patent: May 4, 2010

(54) METHODS AND SYSTEMS THAT SELECTIVELY PERMIT CHANGES TO A CRYPTOGRAPHIC HARDWARE UNIT'S STATE

(75) Inventors: Valiuddin Y. Ali, Houston, TX (US); Lan Wang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1302 days.

(21) Appl. No.: 11/201,008

(22) Filed: Aug. 10, 2005

(65) Prior Publication Data

US 2007/0038856 A1 Feb. 15, 2007

(51) Int. Cl.
*H04L 9/00* (2006.01)
(52) U.S. Cl. .................................. 713/164; 713/189
(58) Field of Classification Search .............. 713/164, 713/189
See application file for complete search history.

(56) References Cited

U.S. PATENT DOCUMENTS

2003/0159056 A1* 8/2003 Cromer et al. .............. 713/193

OTHER PUBLICATIONS

Breslau et al: "Dynamic Object Temporary Stop/Disappearance Notification/Permission" IP.Com Journal, IP.Com Inc., West Henrietta, NY, US, Dec. 1, 1995, XP013105047 ISSN 1533-0001.*
European Search Report for EP 06253607 dated Sep. 20, 2007; 7 pages.
Breslau, F. C., et al.; "Dynamic Object Temporary Stop/Disappearance Notification/Permission"; IBM Technical Disclosure Bulletin, Vo. 38, No. 12, Dec. 1995; 2 pages.
A. Seshadri et al., "SWATT: SoftWare-based ATTestation for Embedded Devices," Security and Privacy, 2004. Proceedings. 2004 IEEE Symposium on pp. 272-282, May 9-12, 2004, 11 pp.
J. G. Dyer et al., "Building the IBM 4758 Secure Coprocessor," Oct. 2001, pp. 57-66.
D. Safford, "Take Control of TCPA," Jul. 31, 2003, 10 pp.
J. Hendricks et al., "Secure Bootstrap is Not Enough: Shoring up the Trusted Computing Base," Proccedings of the Eleventh SIGOPS European Workshop, ACM SIGOPS. Leuven. Belgium. Sep. 2004. 5 pp.

\* cited by examiner

*Primary Examiner*—Gilberto Barron, Jr.
*Assistant Examiner*—Devin Almeida

(57) ABSTRACT

In at least some embodiments, a system comprises a hardware unit and a plurality of software agents that couple to and utilize at least one function of the hardware unit. The system further comprises a consensus module coupled to the hardware unit and the software agents. The consensus module is configured to detect an event that changes a state of the hardware unit, notify the software agents of the event before the state changes and selectively permit the state to change based on responses from the software agents.

23 Claims, 3 Drawing Sheets

METHODS AND SYSTEMS THAT SELECTIVELY PERMIT CHANGES TO A CRYPTOGRAPHIC HARDWARE UNIT'S STATE

BACKGROUND

When applications utilize cryptographic hardware such as the Trusted Platform Module (TPM), there are cases when a TPM state change command such as a "disable" command deems a device or a computer system unusable. For example, if the TPM is utilized to authenticate a user before the Basic Input/Output System (BIOS) boots a system, executing a TPM disable command without first notifying the BIOS causes the system to fail to boot at the next power cycle. Also, if the TPM is utilized to encrypt and un-encrypt data (e.g., data on a hard disk), executing a TPM disable command without first notifying parties (or programs) that depend on the encrypted data prevents the parties from later "unwrapping" the encrypted data. Not being able to recover encrypted data may result in a permanent loss of data as well as a loss of access to the computer system.

BRIEF DESCRIPTION OF THE DRAWINGS

For a detailed description of exemplary embodiments of the invention, reference will now be made to the accompanying drawings in which.

Notation and Nomenclature

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

As more applications (i.e., software agents) are deployed that take advantage of the security capabilities offered by cryptographic hardware such as the Trusted Platform Module (TPM), there is a need to notify these software agents of events that change a critical operational state of the cryptographic hardware (e.g., a command to disable the cryptographic hardware). By notifying the software agents of such events before changes to the critical operational state occur, security services (e.g., security services provided by the software agents) that are dependent on the cryptographic hardware are better protected from data loss or denial of service. For example, in some embodiments, notifying the software agents of such events enables the software agents to delay changes to the critical operational state of the cryptographic hardware for a time or until predetermined criteria is met (e.g., until a timer expires or until predetermined operations provided by the cryptographic hardware are finalized). Additionally or alternatively, notifying the software agents of such events enables the software agents to appropriately disassociate themselves from the cryptographic hardware before (or after) the critical operational state change occurs. In this manner, the software agents are able to continue functioning without unexpected data loss or denial of service due to the critical operational state change of the cryptographic hardware.

Figure 1:
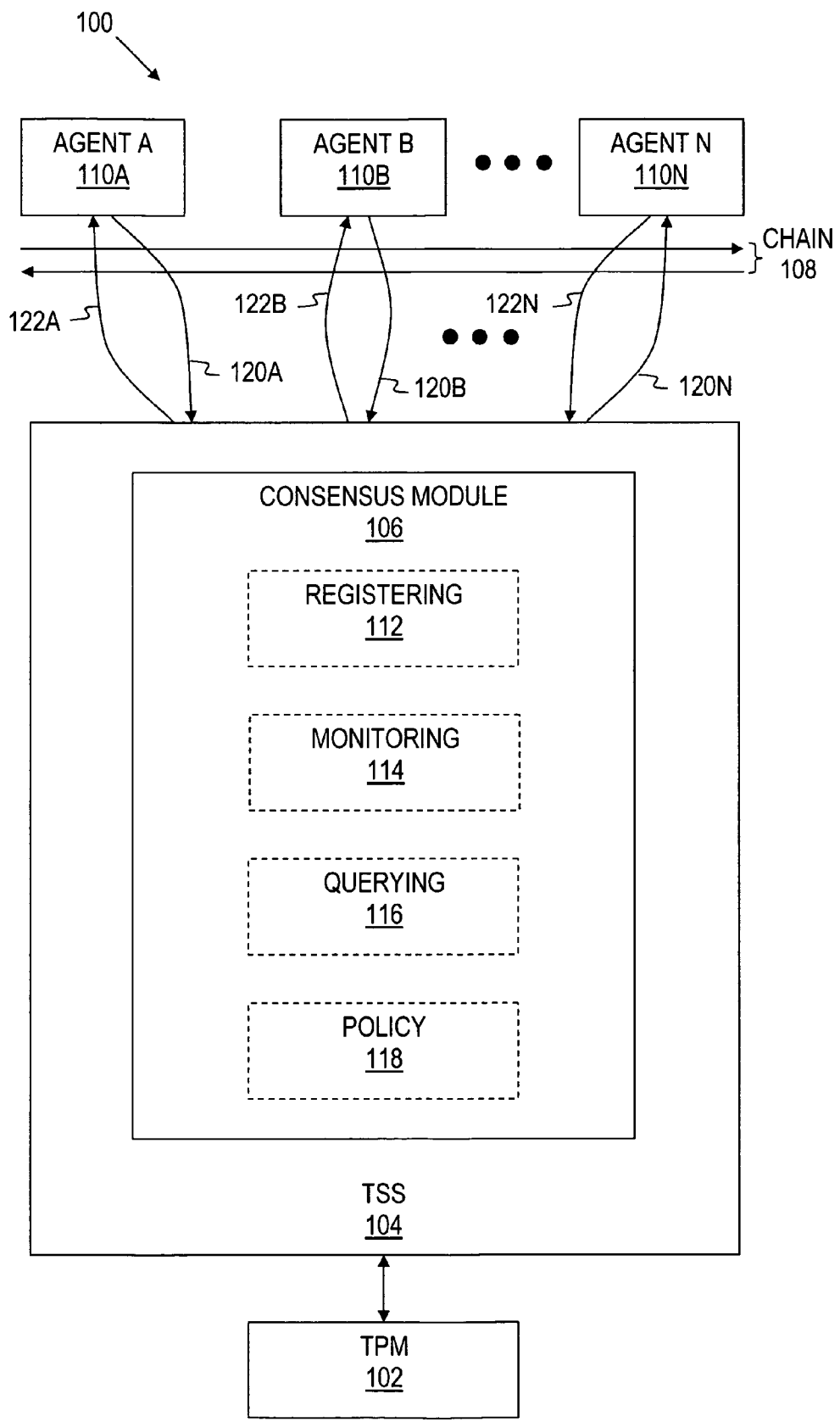
FIG. 1 shows a system in accordance with embodiments of the invention.

FIG. 1 shows a system 100 in accordance with embodiments of the invention. As shown in FIG. 1, the system 100 comprises a plurality of software agents 110A-110N. In at least some embodiments, the software agents 110A-110N are capable of being registered as part of a software chain 108 that will be described in further detail below. The software agents 110A-110N couple to a TPM 102 via a TPM software stack (TSS) 104 and depend on the TPM 102 for security services such as encryption and decryption. The TSS 104 operates as "middleware" for the TPM 102 providing common abstraction, isolation, and management services through a common application programming interface (API). As shown, the TSS 104 comprises a consensus module 106 having a registering component 112, a monitoring component 114, a querying component 116 and a policy component 118. In alternative embodiments, another cryptographic hardware module and software stack (besides the TPM 102 and the TSS 104) may be implemented. In such embodiments, the software stack comprises "middleware" that operates on top of a cryptographic hardware module, providing common abstraction, isolation, and management services through a common application programming interface (API).

If a predetermined event occurs (e.g., a state change command is issued), each registered software agent in the callback chain 108 is notified in sequence. A software chaining mechanism can be defined in many ways. In at least some embodiments, the software chain 108 is defined such that each of the registered software agents of the software chain 108 is notified in a predetermined order. For example, to notify the third software agent of the chain, one starts at the first software agent, proceeds to the second software agent and then the third software agent. Alternatively, the software chain 108 could be defined as an arrangement of software agents that are notified one after the other, but in a non-sequential manner. In at least some embodiments, one or more registered software agents of the software chain 108 is given power to allow, to delay and/or to prevent an intended action (e.g., a state change) of the predetermined event.

If, for example, a software agent aborts the intended action, the consensus module 106 is configured to inform other software agents (e.g., software agents that previously allowed the intended action) that the intended action is being aborted.

Also, the consensus module 106 may provide information regarding which software agent aborted the intended action. If, on the other hand, every registered software agent allows the intended action, the consensus module 106 is configured to inform the software agents that occurrence of the intended action is now imminent. In alternative embodiments, other chaining mechanisms, now known or later developed, could be used as long as registered software agents are empowered to abort or delay an intended action.

As previously mentioned, the TSS 104 comprises a consensus module 106 having a registering component 112, a monitoring component 114, a querying component 116 and a policy component 118. The consensus module 106 allows the software agents 110A-110N to be notified of events that change a critical operational state of the TPM 102 before the critical operational state change occurs. After notification, the software agents 110A-110N are able to delay changes to the critical operational state of the TPM 102 for a time or until predetermined criteria is met. Additionally or alternatively, the software agents 110A-110N are able to disassociate themselves from the TPM 102 before (or after) the critical operational state change occurs without unexpected data loss or denial of service.

To notify the software agents 110A-110N of events that change the critical operational state of the TPM 102, the software agents 110A-110N register with the TSS 104. For example, the registering component 112 of the consensus module 106 may permit the software agents 110A-110N to request registration or permit the consensus module 106 to query the applications 110A-110N for registration. Thereafter, the registering component 112 stores information that identifies which of the software agents 110A-110N are registered. In at least some embodiments, only the software agents which are registered with the registering component 112 will be notified of events that change the critical operational state of the TPM 102.

The monitoring component 114 monitors data from the data lines 120A-120N to detect events that change a critical operational state of the TPM 102. In at least some embodiments, the monitoring component 114 is configured to detect TPM disable commands. For example, an owner or authorized user of the TPM 102 may issue a TPM disable command that disables the TPM 102 temporarily or permanently. Although other events (e.g., an enable command) may change a critical operational state of the TPM 102, an illustrative example based on a TPM disable command is described herein.

Upon detecting the TPM disable command, the monitoring component 114 causes the TPM disable command to be buffered, re-directed or otherwise prevents the TPM disable command from being processed by the TPM 102 until a predetermined amount of time has passed or until predetermined criteria is met. The monitoring component 114 also notifies the querying component 116 that the TPM disable command was detected.

The querying component 116 notifies the software agents 110A-110N (assuming all of the software agents 110A-110N are registered) of the intended TPM disable command and queries the software agents 110A-110N for a response via the query signals 122A-122N. In at least some embodiments, the querying component 116 is associated with a "call-back" mechanism. As used herein, a call-back mechanism refers to a communication interface between the TSS 104 and software agents that are registered to be informed if the TPM's state changes (e.g., from "active" to "disabled"). The communication interface may be, for example, a component object model (COM) interface, a distributed component object model (DCOM) remote procedure call (RPC) interface, a Web Services-based interface, an Extensible Markup Language (XML) interface, a Simple Object Access Protocol (SOAP) interface or another interface now known or later developed.

The policy component 118 establishes rules that determine how the software agents 110A-110N are queried and how responses received (or not received) from the software agents 110A-110N are interpreted. In at least some embodiments, the policy component 118 establishes that each registered software agent in the chain 108 is notified of intended critical state changes to the TPM 102 and is given an opportunity to respond before the TPM 102 is allowed to change states (e.g., from active to disabled).

For example, in some embodiments, each registered software agent is informed of the intended critical state change in turn (e.g., in round-robin fashion). Upon being notified, a registered software agent is able to complete all tasks that are necessary for continued successful operation after the TPM 102 is disabled. Once a registered software agent has completed the necessary tasks, control of the chain 108 is given back to the "caller" (e.g., the call-back mechanism implemented by the TSS 104), which notifies the next registered software agent in the chain 108. At the end of the chaining operation, the critical state change is allowed (e.g., the TPM 102 is allowed to process the TPM disable command).

In some embodiments, the policy component 118 establishes a response time period for each registered software agent. Thus, each registered software agent is given a threshold amount of time to respond to the notification before control of the chain 108 is passed again to the caller, which notifies the next registered software agent. If a registered software agent does not respond within the threshold amount of time, the policy component 118 is configured to interpret the lack of response. For example, the lack of response may be interpreted as a permission to process the TPM disable command, as an "unable to respond" state or as a "hung" state.

In at least some embodiments, the policy component 118 establishes that one or more of the registered software agents can veto or otherwise cause the TPM disable command to be rejected. For example, the policy component 118 may establish that registered software agents that are unable to automatically disassociate (or re-associate) themselves with the TPM 102 are granted veto power over TPM disable commands. Likewise, the policy component 118 may establish that registered software agents that are unable to transparently (without notifying a user) disassociate (or re-associate) themselves with the TPM 102 are granted veto power over TPM disable commands. Likewise, the policy component 118 may establish that registered software agents that are unable to disassociate (or re-associate) themselves with the TPM 102 without a predetermined amount of complexity are granted veto power over TPM disable commands. In at least some embodiments, the TSS 104 is configured to record which software agent vetoed the TPM disable command and to inform the administrator or authorized user that issued the TPM disable command accordingly.

As an example of a software agent that is given veto power, consider a case where the TPM 102 is used to protect a hard disk drive lock password (commonly referred to as "Drive Lock"). Drive Lock is typically only enabled or disabled during a computer system's boot time. Thus, it is not feasible (and in some instances, not possible) to disable the Drive Lock feature until the next time the computer system reboots. In this case, the TPM Disable Command should not be executed until the hard disk has been unlocked. Otherwise, the system BIOS (or an equivalent software agent) will not be able to use to the TPM 102 to unlock the drive, resulting in a loss of usability for the hard drive. If the hard drive is the primary drive of the computer system, a user also loses access to the computer system as well.

As another example of a software agent that is given veto power, consider a full disk encryption software agent that uses the TPM 102 to protect a symmetric key that protects the entire contents of the hard disk. Before the TPM 102 is disabled, the full disk encryption software agent needs time to disassociate the data protection key from the TPM 102 (and protect it by other means) or to unprotect the entire contents of the hard disk. Otherwise, the next time the computer system boots, the full disk encryption software will not be able to use the TPM 102 to unlock the protection key for the disk. In such case, the computer system will no longer be able to boot and the user will have no access to the data on the disk.

The policies provided by the policy component 118 are dynamically customizable or selectable by an administrator or authorized user. For example, an authorized administrator may select whether to implement a response time period or not. If a response time period is selected, the authorized administrator is able to choose the response time period and/or the interpretation of a non-response (e.g., non-responses may be interpreted as a response giving permission to process the TPM disable command, an "unable to respond" state or a "hung" state). The authorized administrator is also able to select whether to implement veto power or not. If veto power is selected, the authorized administrator is able to choose which software agents have veto power and/or under what conditions software agents are able to exercise veto power. For example, in some embodiments, software agents that are unable to automatically disassociate or re-associate themselves with the TPM 102 are granted veto power.

In response to a query, registered software agents are able to provide one of a set of responses. For example, each registered software agent may provide one of an "OK to disable" (OK) response, a "reject disable command" (REJECT) response and a "check back later" (CHECK BACK) response. The policy component 118 establishes which of these responses are accepted by the TSS 104. For example, if the policy component 118 establishes that no software agents are authorized to veto the TPM disable command, the TSS 104 will not honor REJECT responses. Also, the policy component 118 may establish that only up to a predetermined number of CHECK BACK responses from each software agent (or all of the software agents) will be honored before the TPM 102 is able to process the TPM disable command.

Based on the responses (and non-responses) from the registered software agents, the policy component 118 also establishes one of a set of actions for the TSS 104 to perform. In at least some embodiments, the policy component 118 establishes a "disable the TPM" (DISABLE) action, a "leave the TPM enabled" (LEAVE ENABLED) action, a "call back software agents later" (CALL BACK) action and an "ask for TPM owner's direction" (ASK OWNER) action.

If the DISABLE action is performed, the TSS 104 allows the TPM 102 to process the TPM disable command. Alternatively, the DISABLE action may generate and transmit a new TPM disable command (e.g., if the original TPM disable command is no longer available or if generating a new TPM disable command reduces complexity). If the LEAVE ENABLED action is performed, the TSS 104 does not allow the issued TPM disable command to be processed. If the CALL BACK action is performed, the TSS 104 waits for a predetermined amount of time before querying appropriate software agents (e.g., software agents that provided a REJECT response, a CHECK BACK response or a non-response) again.

If the ASK OWNER action is performed, the TSS 104 transmits a message (e.g., an email, a pop-up message or another message) to the TPM owner or authorized user. The message may be transmitted directly or indirectly through intermediaries designated as authorized delegates on behalf of the owner or the authorized user. This allows the TPM owner or authorized user to select the DISABLE action, the LEAVE ENABLE action or the CHECK BACK action provided by the TSS 104. In some embodiments, the message comprises information regarding the responses of the registered software agents. The administrator or authorized user is thus able to make an informed decision regarding whether to disable the TPM 102 or not. The message also may facilitate the administrator's or authorized user's access to existing policies as well as policy options of the policy component 118 by listing those policies (or providing a link to access the policies) in the message.

Although the notification process of FIG. 1 is illustrated with respect to a TPM disable command, the notification process is also extendable to the case where the TPM 102 is enabled (after being disabled). In such a case, the registering component 112 registers software agents to be notified if a TPM enable command is issued. In response to detecting the TPM enable command by the monitoring component 114, the querying component 116 informs registered or interested software agents that the TPM 102 is again available. The software agents are able to respond to the query by associating their operations with the security (e.g., encryption and decryption) provided by the TPM 102. For example, a hard disk software agent is able to encrypt data and decrypt data on the hard drive based on the cryptographic capabilities of the TPM 102. In the case of enabling the TPM, the policy component 118 may establish policies for handling responses from the registered software agents, prioritizing the registered software agents, calling back software agents that are busy or are otherwise non-responsive, or other policies. Again, the policies established by the policy component 118 may be dynamically customized and selected by an administrator or authorized user of the TPM 102.

Figure 2:
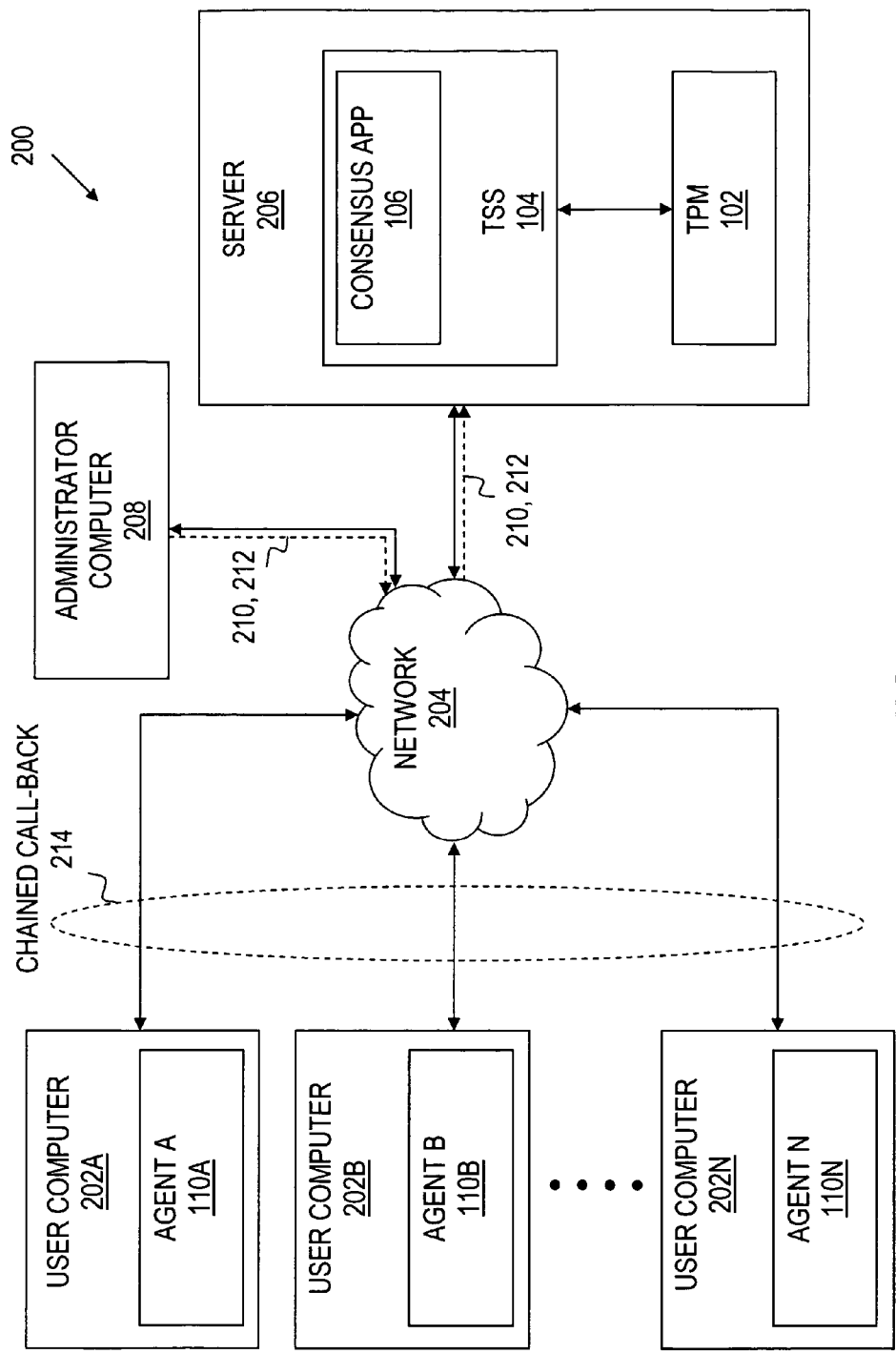
FIG. 2 shows a network-based system in accordance with embodiments of the invention.

FIG. 2 shows a network-based system 200 in accordance with embodiments of the invention. As shown in FIG. 2, the system 200 comprises a plurality of user computers 202A-202N coupled to a server 206 via a network 204. The server 206 comprises a TPM 102 and a TSS 104 having a consensus module 106. Also, the user computers 202A-202N each have at least one software agent that depends on the TPM 102 for security operations (e.g., encryption and decryption). As shown, the user computer 202A is associated with the software agent 110A, while the user computer 202B is associated with the software agent 110B and so on. The software agents 110A-110N may be, for example, applications, device drivers, or other software proxy agents acting for the BIOS of each of the user computers 202A-202N. The system 200 also may comprise an administrator computer 208 that is configured to transmit enable commands 210 and disable commands 212 to the TPM 102 based on input from an administrator or authorized user.

As previously described, the consensus module 106 may register the software agents 110A-110N to be notified of events that change the critical operational state of the TPM 102. For example, an event that changes the critical operational state of the TPM 102 may be the issuance of the enable command 210 or the disable command 212. Upon detecting the event, the consensus module 106 queries the software agents 102A-102N before the TPM's state is allowed to change. In at least some embodiments, the system 200 implements a chained call-back mechanism 214 to notify or inform the software agents 102A-102N of the event as previously described.

The software agents 110A-110N are able to transmit responses to the TSS 104 via the network 204. Each response may give permission to change the critical operational state of the TPM 102, request that the change not be allowed, request that the change be delayed for a predetermined amount of time or request a "call-back" after a predetermined amount of time. The consensus module 106 determines an action to perform based on the responses and based on established policies. As previously described, the consensus module 106 may implement the policy module 118 to establish and update policies. In at least some embodiments, the policies are customizable and/or selectable by an administrator or authorized user. In this manner, time limits, veto power and other policy considerations may be adjusted to meet the different needs or the changing needs of TPM-based applications, TPM owners or authorized TPM users.

The TPM 102 is capable of being used for a variety of purposes. In at least some embodiments, the TPM 102 is implemented to authenticate users of the user computers 202A-202N. For example, a user may be authenticated by the TPM 102 before or during each user computer's boot process. The user-authentication provided by the TPM 102 takes place by virtue of a middle agent such as a computer system's BIOS, which indirectly verifies the user of the TPM 102 by asking the user to provide authentication secrets. The authentication secrets are used by the middle agent with the TPM 102 (e.g., by comparing the authentication secrets with a TPM-protected secret that was previously stored). The TPM-protected secret may be, for example, a TPM user-key BLOB (binary large object). If the TPM 102 decrypts the BLOB correctly, the user is determined to be the rightful owner/user of the computer system by virtue of having the correct authentication secrets.

Additionally or alternatively, the TPM 102 may be implemented to encrypt and decrypt information stored on the user computers 202A-202N (e.g., information stored on hard drives). Also, the TPM 102 may authenticate software (e.g., transaction software) running on a remote system of the network 204. Also, the TPM 102 may uniquely or pseudo-anonymously identify computer systems on a network that is TPM-enabled. Also, the TPM 102 may be used to protect partial secrets on a computer system such as medical information, government identity numbers, a user finger print, a user address, or credit card information. For additional details on how the TPM 102 can be used, reference may be made to published information provided by the Trusted Computing Platform Alliance (TCPA) or the Trusted Computing Group (TCG).

By implementing the consensus module 106, the software agents 110A-110N of the user computers 202A-202N that depend (or could depend) on the TPM 102 are at least notified if an event that changes the critical operational state of the TPM 102 has occurred. The software agents 110A-110N are then able to perform actions and/or respond to the event before (or after) the state change occurs. For example, if an event occurs that will change the TPM's state from "enabled" to "disabled," at least one of the software agents 110A-110N may be able to disassociate itself from the TPM 102 before the TPM 102 is disabled. This prevents unexpected data loss or lack of service due to the disabled TPM 102. Again, policies may be established, for example, that permit all software agents 110A-110N to dissociate themselves before the TPM 102 is disabled, that provide a time limit to software agents 110A-110N to dissociate themselves before the TPM 102 is disabled, or that grant one of more of the software agents 110A-110N veto power to prevent the TPM 102 from being disabled.

In at least some embodiments, the veto power is based, for example, on one or more considerations such as software agent types, the ability of each software agent 11 A-110N to dissociate itself from the TPM 102, the ability of each software agent 110A-110N to re-associate itself with the TPM 102 or a prioritization of the software agents 110A-110N by an administrator or authorized user. Also, other prioritization schemes may be implemented to establish how the software agents are registered or queried. The priority schemes may apply to how responses received from different software agents are considered by the consensus module 106. For example, one software agent may be given more time to disassociate itself from the TPM 102 than other software agents and so on.

If an event occurs that changes the TPM's state from "disabled" to "enabled," at least one of the software agents 110A-110N may be able to re-associate itself automatically with the TPM 102 before or after the TPM 102 is enabled. This may be performed in a manner that is transparent to the users of the user computers 202A-202N. Thus, software agents that are registered with the consensus module 106 are able to take advantage of the services provided by the TPM 102 in a manner that is automated and transparent to users. The registered software agents are also able to disassociate and re-associate themselves with the TPM 102 in an efficient manner that reduces unexpected data loss and lack of services. Again, policies of the consensus module 106 may be established that affect the registering processing, the querying process, how responses from the software agents 110A-110N are interpreted and what actions are performed by the TSS 104 based on the responses (and non-responses).

Figure 3:
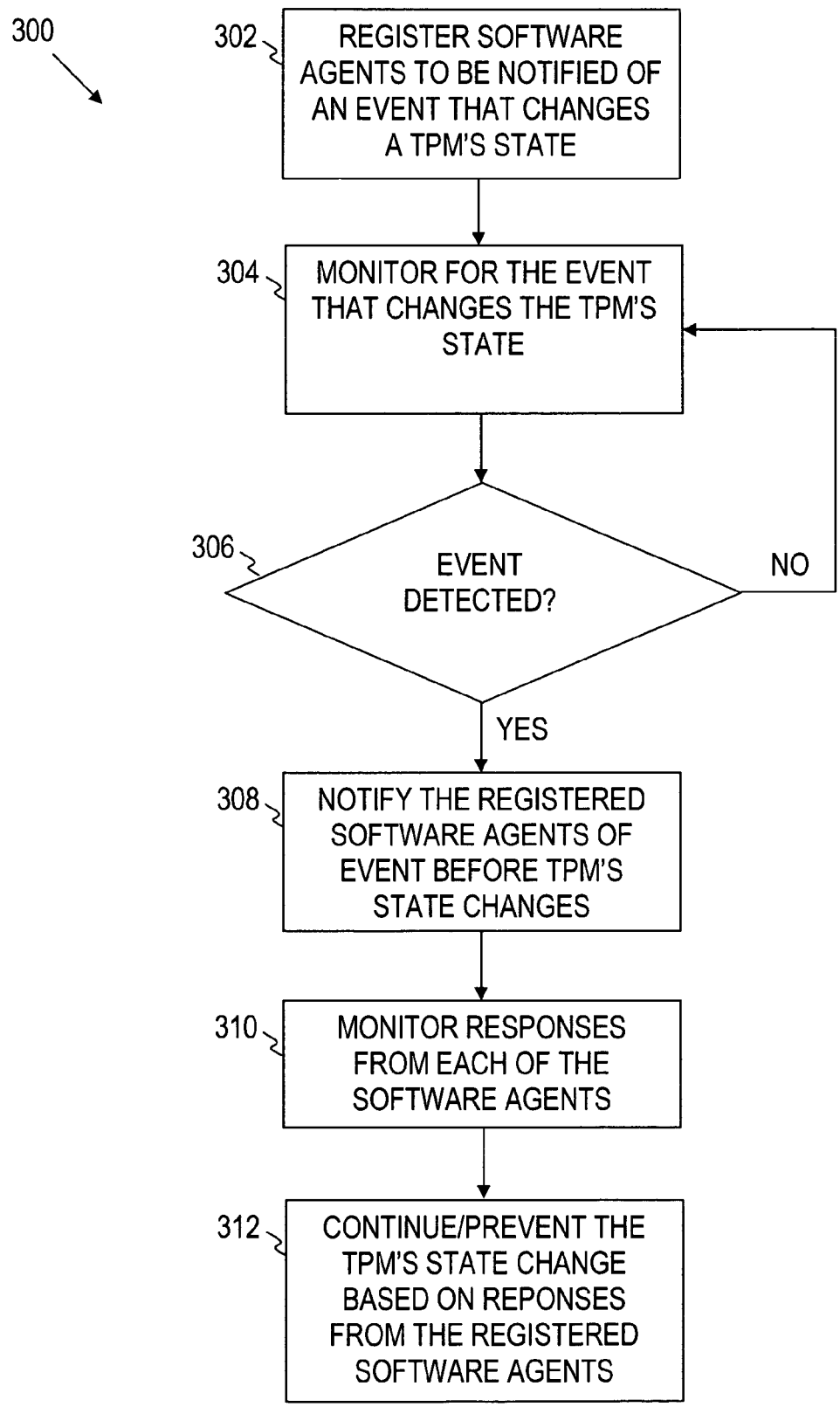
FIG. 3 shows a method in accordance with embodiments of the invention.

FIG. 3 shows a method 300 in accordance with embodiments of the invention. As shown in FIG. 3, the method 300 comprises registering software agents to be notified of an event that changes a TPM's state (block 302). For example, the event may be a TPM enable command or a TPM disable command. The method 300 further comprises monitoring for the event that changes the TPM's state (block 304). If the event is not detected (determination block 306), the method 300 continues to monitor for the event that changes the TPM's state (block 304). If the event is detected (determination block 306), the registered software agents are notified of the event before the TPM's state changes (block 308). Thereafter, responses from the registered software agents are monitored (block 310). For example, the registered software agents may respond by giving permission to change the TPM's state, requesting that the TPM's state not be changed (at least not for a predetermined amount of time) or requesting to be called-back at a later time. Finally, the TPM's state change is allowed or prevented based on the responses from the registered software agents (block 312). As previously described, policies may be established to determine the effect of the responses, to determine time limits for the responses, to enable registered software agents to veto the state change or other policy considerations. The policies are adjustable by a TPM administrator or authorized user.

The above discussion is meant to be illustrative of the principles and various embodiments of the present invention. Numerous variations and modifications will become apparent to those skilled in the art once the above disclosure is fully appreciated. For example, the consensus module is described as being part of a TSS (a TPM software stack). However, in some embodiments, the consensus module could be separate from the TSS and communicates with the TSS to perform the functions described herein. Also, the consensus module may comprise software elements, hardware elements or a combination of hardware and software elements. It is intended that the following claims be interpreted to embrace all such variations and modifications.

What is claimed is:

1. A system, comprising:
   a hardware unit;
   at least one computer coupled to the hardware unit, the at least one computer having software agents that utilize a function provided by the hardware unit; and
   a consensus module coupled to the hardware unit and the at least one computer, the consensus module is configured to detect an event that changes a state of the hardware unit, notify the software agents of the event before the state changes, and selectively permit the state to change based on responses from the software agents.

2. The system of claim 1 wherein the hardware unit comprises a cryptographic hardware unit.

3. The system of claim 2 wherein the cryptographic hardware unit comprises a Trusted Platform Module (TPM).

4. The system of claim 3 wherein the consensus module is implemented as part of a TPM software stack.

5. The system of claim 1 wherein the event comprises a command that disables the hardware unit.

6. The system of claim 1 wherein the event comprises a command that enables the hardware unit.

7. The system of claim 1 wherein the consensus module comprises a registering component that registers the software agents such that only registered software agents are notified of the event.

8. The system of claim 7 wherein the consensus module comprises a querying component that permits each software agent a predetermined amount of time to respond to being notified of the event before proceeding to query a next software agent.

9. The system of claim 1 wherein the responses are selected from the group consisting of a response that grants permission to changing the state, a response that rejects changing the state and a response that requests a delay before changing the state.

10. The system of claim 9 wherein the consensus module comprises a policy component that enables a user to customize how the responses are considered.

11. A method, comprising:
    querying, by a computer, a plurality of software agents regarding an event that changes an operational state of a cryptographic hardware unit; and
    selectively permitting, by the computer, changes to the operational state of the cryptographic hardware unit based on responses from the software agents.

12. The method of claim 11 further comprising monitoring a data line to detect the event, the event selected from a group consisting of a command that disables the cryptographic hardware unit and a command that enables the cryptographic hardware unit.

13. The method of claim 11 further comprises registering the plurality of software agents to be notified of the event and to provide a response.

14. The method of claim 11 further comprising transmitting a message to a user based on the responses, the message detailing at least one of the responses and querying the user for instructions.

15. The method of claim 14 wherein selectively permitting changes to the operational state of the cryptographic hardware unit comprises considering responses that give permission to change the operational state, responses that reject changing the operational state and responses that request a delay before changing the operational state.

16. The method of claim 11 further comprising prioritizing the responses based on each software agent's ability to disassociate itself with the cryptographic hardware unit.

17. A storage medium having computer-readable instructions that, when executed, cause a computer to:
    query a plurality of software agents regarding an event that changes an operational state of a cryptographic hardware unit; and
    selectively permit changes to the operational state of the cryptographic hardware unit based on responses from the software agents.

18. The storage medium of claim 17 wherein the computer-readable instructions, when executed, further cause the computer to detect the event and delay changes to the operational state of the cryptographic hardware unit until a predetermined amount of time has passed.

19. The storage medium of claim 17 wherein the computer-readable instructions, when executed, further cause the computer to detect the event and delay changes to the operational state of the cryptographic hardware unit until a predetermined criteria is met.

20. The storage medium of claim 19 wherein the computer-readable instructions, when executed, further cause the computer to adjust the predetermined criteria based on instructions from a user.

21. A system, comprising:
    means for notifying a plurality of software agents regarding an event that changes an operational state of a cryptographic hardware unit; and
    means for selectively permitting changes to the operational state of the cryptographic hardware unit based on responses from the software agents.

22. The system of claim 21 further comprising means for registering the plurality of software agents to be notified regarding the event before changes to the operational state of the cryptographic hardware unit occur.

23. A system, comprising:
    a cryptographic hardware unit;
    at least one computer coupled to the hardware unit, the at least one computer having software agents that utilize a function provided by the hardware unit; and
    a consensus module coupled to the hardware unit and the at least one computer, wherein the consensus module is configured to detect occurrences of commands that disable the cryptographic hardware unit and commands that enable the cryptographic hardware unit, notify the software agents of each command before the cryptographic hardware unit changes its state, and selectively permit the state of the cryptographic hardware unit to change based on responses from the software agents.

* * * * *